(12) United States Patent  
Kimura et al.

(10) Patent No.: US 8,493,686 B2  
(45) Date of Patent: Jul. 23, 2013

(54) LOW PROFILE HARD-DISK DRIVE ENCLOSURE COVER WHICH INCLUDES A FLANGE RECESS FOR ACCOMMODATING A SATA CONNECTOR

(75) Inventors: Shinichi Kimura, Kanagawa (JP); Hiroki Kitahori, Kanagawa (JP); Nobuyuki Okunaga, Kanagawa (JP); Takao Suzuki, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 330 days.

(21) Appl. No.: 12/787,322

(22) Filed: May 25, 2010

(65) Prior Publication Data

US 2011/0292541 A1    Dec. 1, 2011

(51) Int. Cl.  
*G11B 33/12*    (2006.01)

(52) U.S. Cl.  
USPC ........................... 360/99.23; 360/99.25

(58) Field of Classification Search  
USPC .......... 360/99.15, 99.16, 99.17, 99.18, 99.19, 360/99.23, 99.24, 99.25, 97.11, 99.2; 361/679.33; 710/74  
See application file for complete search history.

(56) References Cited

U.S. PATENT DOCUMENTS

| | | | |
|---|---|---|---|
| 5,420,733 A * | 5/1995 | Knighton et al. | 360/99.16 |
| 5,563,767 A | 10/1996 | Chen | |
| 6,025,973 A * | 2/2000 | Mizoshita et al. | 360/98.08 |
| 6,108,162 A * | 8/2000 | Amirkiai et al. | 360/99.25 |
| 6,351,344 B1 | 2/2002 | Krum et al. | |
| 6,473,263 B2 | 10/2002 | Jang et al. | |
| 6,549,379 B1 | 4/2003 | Kazmierczak et al. | |
| 6,560,063 B1 | 5/2003 | Keffeler et al. | |
| 7,149,051 B2 * | 12/2006 | Yu et al. | 360/99.25 |
| 7,548,418 B2 * | 6/2009 | Martin et al. | 361/679.37 |
| 7,626,811 B2 | 12/2009 | Kamigama et al. | |
| 7,630,170 B2 | 12/2009 | Hayakawa et al. | |
| 7,940,491 B2 * | 5/2011 | Szeremeta et al. | 360/99.23 |

FOREIGN PATENT DOCUMENTS

| | | |
|---|---|---|
| EP | 0526703 | 2/1993 |
| WO | WO-97/26654 | 7/1997 |

OTHER PUBLICATIONS

PC Guide, et al., "Base Casting and Top Cover", http://www.pcguide.com/ref/hdd/op/packCasting-c.html, (2004),1-2.

Samsung, "Noise Guard", http://www.samsung.com/global/business/hdd/learningresource/whitepapers/LearningResource_NoiseGuard.html, (Jun. 2000),1-3.

* cited by examiner

*Primary Examiner* — Jefferson Evans

(57) ABSTRACT

A disk-enclosure cover for a low-profile, hard-disk drive (HDD). The disk-enclosure cover includes a substantially flat, plate-like portion that includes a periphery, and a peripheral flange that is disposed at the periphery. The peripheral flange includes a recessed portion that is configured to be recessed from a SATA connector in proximity to the SATA connector. In addition, the recessed portion is configured to allow a top portion of the SATA connector to be disposed in close proximity to the peripheral flange when the SATA connector is seated on a receiving connector of the low-profile HDD.

20 Claims, 8 Drawing Sheets

US 8,493,686 B2

LOW PROFILE HARD-DISK DRIVE ENCLOSURE COVER WHICH INCLUDES A FLANGE RECESS FOR ACCOMMODATING A SATA CONNECTOR

TECHNICAL FIELD

Embodiments of the present invention relate generally to the field of magnetic-recording, hard-disk-drives (HDDs).

BACKGROUND

The magnetic-recording, hard-disk-drive (HDD) industry is extremely competitive. The demands of the market for ever increasing storage capacity, storage speed, and other enhancement features compounded with the desire for low cost creates tremendous pressure for improved performance of the HDD. Therefore, engineers and HDD designers are constantly striving to increase, amongst other things, the storage capacity of the HDD design.

For example, engineers and HDD designers have succeeded in raising the areal-recording density of magnetic-recording disks, so that for some applications it is now possible to provide sufficient storage capacity in a HDD having but a single magnetic-recording disk. At the same time, new miniaturized devices have come to market that can benefit from the advantages of using a HDD having but a single magnetic-recording disk. Thus, engineers and HDD designers endeavor to fulfill the demands of the marketplace for HDDs having high storage capacity for these miniaturized devices.

SUMMARY

Embodiments of the present invention include a disk-enclosure cover for a low-profile, hard-disk drive (HDD). The disk-enclosure cover includes a substantially flat, plate-like portion that includes a periphery, and a peripheral flange that is disposed at the periphery. The peripheral flange includes a recessed portion that is configured to be recessed from a SATA connector in proximity to the SATA connector. In addition, the recessed portion is configured to allow a top portion of the SATA connector to be disposed in close proximity to the peripheral flange when the SATA connector is seated on a receiving connector of the low-profile HDD.

DESCRIPTION OF THE DRAWINGS

The accompanying drawings, which are incorporated in and form a part of this specification, illustrate embodiments of the invention and, together with the description, serve to explain the embodiments of the invention.

Figure 1:
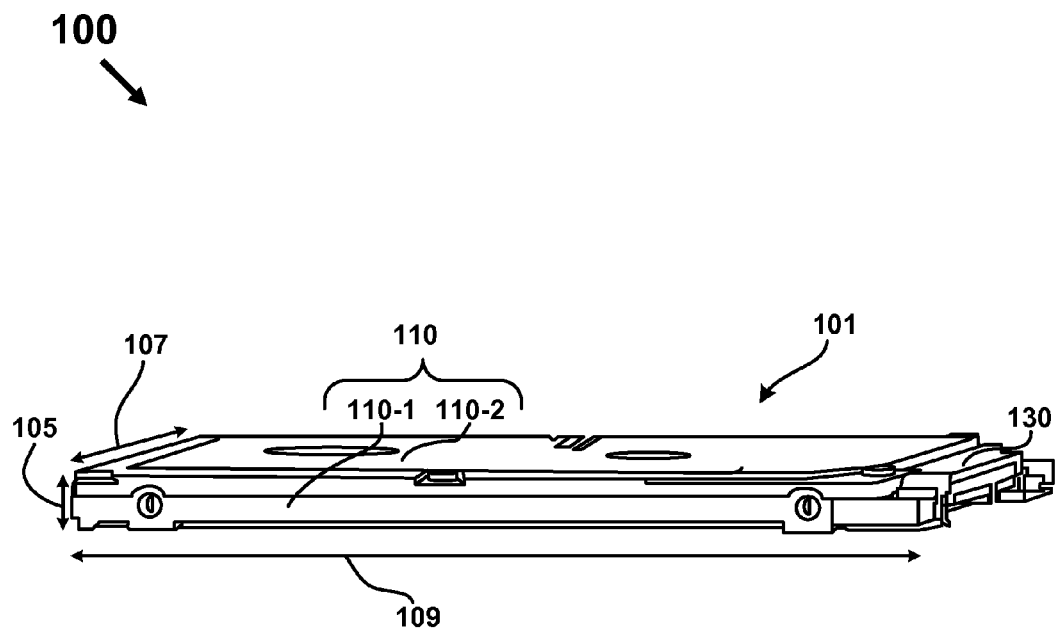
FIG. 1 is a perspective view of a low-profile, hard-disk drive (HDD) showing the disk enclosure (DE) and the attachment of a serial advanced technology attachment (SATA) connector to the low-profile HDD at the back end of the DE, in accordance with embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Physical Description of Embodiments of the Present Invention for a Disk-Enclosure Cover for a Low-Profile, Hard-Disk Drive Embodiments of the present invention relate to the construction of a low-profile, hard-disk drive (HDD). In particular, embodiments of the present invention relate to the design of a top cover, also referred to herein as a disk-enclosure (DE) cover, and a chassis, also referred to herein as a DE base, of the low-profile HDD.

As is known in the art, in current 2.5 inch low-profile HDDs, the host interface is commonly of the serial advanced technology attachment (SATA) type. In the case of a SATA interface connector, the external shape is practically standardized, the height being about 5 millimeters (mm). The external shape of a 2.5 inch low-profile HDD is also standardized; at present, 2.5 inch low-profile HDDs are usually employed whose HDD height is 9.5 mm, which accommodate two magnetic-recording disks. The mechanical components, namely, the magnetic-recording disk and magnetic-recording head, are assembled with the DE base; and, the DE base is covered by a top cover formed by press-forming. In press forming the DE cover, the top cover, a sheet of metal is deformed to impress contours into the DE cover corresponding to, for example, air-flow channels above the magnetic recording disk, which have a shallow depth; these contours, although upset from the flat surface of the sheet of metal, leave the DE cover with a substantially flat, plate-like portion. As used herein, the term of art, "substantially flat," as applied to the plate-like portion of the DE cover refers to a DE cover having such contours of shallow depth. The top cover is formed by pressing processing applied to a metal plate; the rigidity of the top cover is produced by the provision of a bent portion located at the periphery of the top cover. The bent portion may also be referred to herein as a peripheral flange 330. The height of the bent portion of the top cover located at the periphery of the top cover is about 2.5 mm. For a conventional HDD having a height of 9.5 mm, there is no interference of the SATA connector with the bent portion of the top cover.

Thanks to recent improvements in magnetic recording density, information can be recorded employing only a single magnetic-recording disk, which is adequate for many applications, such as for example, a low-profile HDD. For this reason, in accordance with embodiments of the present invention, 2.5 inch miniature, low-profile HDDs with a height of 7 mm that accommodate only a single magnetic-recording disk may now be introduced into the marketplace. This is because miniature, low-profile HDDs contribute to miniaturization and space-saving in host equipment, such as for example, a personal computer (PC) that incorporates a 2.5 inch miniature, low-profile HDD. However, if the height dimension of a conventional 2.5 inch HDD of height 9.5 mm is simply shrunk, the total height of the SATA connector of height 5 mm and the bent portion of the top cover of height 2.5 mm is 7.5 mm. Thus, a HDD height of 7 mm cannot be achieved. In order to realize a HDD height of 7 mm, consideration has been given to displacing the mounting position of the magnetic-recording disk to the opposite side to that of the SATA connector, so as to eliminate interference with the SATA connector. However, if the mounting position of the magnetic-recording disk is displaced, the space provided for the actuator mechanism used for moving the magnetic-recording head over the magnetic-recording disk is reduced, so it becomes difficult to produce sufficient torque for a voice-coil motor (VCM), with the result that access speed becomes slow. Also, if the mounting position of the magnetic-recording disk is displaced, the automatic assembly apparatus that is conventionally employed on the manufacturing line of 2.5 inch low-profile HDDs cannot be employed without modification, which involves an alteration of the automatic assembly apparatus in accordance with the displacement of the magnetic-recording disk mounting position. This also may lower production efficiency, since commonality of the production line between products is impaired. Therefore, embodiments of the present invention provide for a 2.5 inch low-profile HDD with an HDD height of 7 mm such that the above described issues do not arise, because interference between the SATA connector and the bent portion of the top cover is avoided.

For embodiments of the present invention, the mounting position of the magnetic-recording disk in plan view is unchanged. In fact, the only location where interference occurs is at the shoulder of the mounting portion of the SATA connector, so interference could be avoided by rebating the edge face of the DE base in this portion. However, in respect of the outermost periphery of the magnetic-recording disk on the side of the SATA connector, the rebated DE base edge face would then interfere with the magnetic-recording disk. As regards this portion, therefore, the position of the edge face of the DE base cannot be altered. Therefore, in accordance with embodiments of the present invention, to partially avoid interference, the height of the bent portion is lowered in this region. In accordance with embodiments of the present invention, the height of the bent portion is lowest at the outermost periphery of the magnetic-recording disk on the side of the SATA connector, and gradually decreases in the vicinity of the SATA connector. By way of example, in accordance with embodiments of the present invention, an arch-shaped recess, without limitation thereto, as seen from the side face of the DE, is provided. Also, in the vicinity of the recess, the rigidity of the top cover is reduced, so it becomes difficult to produce air tightness by crushing into place a sealing member, for example, made of rubber, which is sandwiched between the DE base and the top cover in order to prevent air leakage. Therefore, in accordance with embodiments of the present invention, to compensate for the lessened rigidity of this portion of the top cover, the position of the screws for mounting the top cover on the DE base, the screw spacing is made smaller in the vicinity of the recess. In this way, air tightness can be produced by thoroughly crushing into place the sealing member with the same screw tightening torque as previously employed.

Thus, in accordance with embodiments of the present invention, a 2.5 inch low-profile HDD of HDD height 7 mm can be realized that is provided with a SATA connector, which is the standard type of connector. Moreover, in accordance with embodiments of the present invention, even with this construction, fully sufficient air tightness of the low-profile HDD can be provided, and the effects on the existing 2.5 inch low-profile HDD production line can be minimized.

With reference now to FIG. 1, in accordance with embodiments of the present invention, a perspective view 100 is shown of a low-profile HDD 101. FIG. 1 shows a DE 110 and the attachment of a SATA connector 130 to the low-profile HDD 101 at the back end of DE 110. In accordance with embodiments of the present invention, the DE 110 for the low-profile HDD 101 includes a DE base 110-1, and a DE cover 110-2. In accordance with embodiments of the present invention, the DE base 110-1 is configured to form an air-tight seal with the DE cover 110-2; the air-tight seal is formed by compressing a sealing member (not shown) between the DE base 110-1 and the DE cover 110-2, as previously described. As shown in FIG. 1, low-profile HDD 101 has a HDD height 105, a HDD width 107, and a HDD length 109; the double headed arrows designating these respective heights are directed respectively along a height direction, a width direction and a length direction of low-profile HDD 101. The terms of art, "low profile," and "low-profile" refer to the fact that the low-profile HDD 101 has a HDD height less than the HDD height of a conventional HDD, which is 9.5 mm, as previously described. In accordance with embodiments of the present invention, the low-profile HDD 101 has a DE 110 that is relatively thin, and has a HDD height 105 of less than or equal to about 7 millimeters (mm), in the HDD thickness direction. Embodiments of the present invention include the low-profile HDD 101 including a DE 110 of low profile. Embodiments of the present invention subsequently described for the DE base 110-1, the DE cover 110-2 and the DE 110 may be incorporated within the environment of low-profile HDD 101, without limitation; and, therefore, embodiments of the present invention for the low-profile HDD 101 include embodiments of the present invention for the DE base 110-1, the DE cover 110-2 and the DE 110 that are subsequently described.

Figure 2:
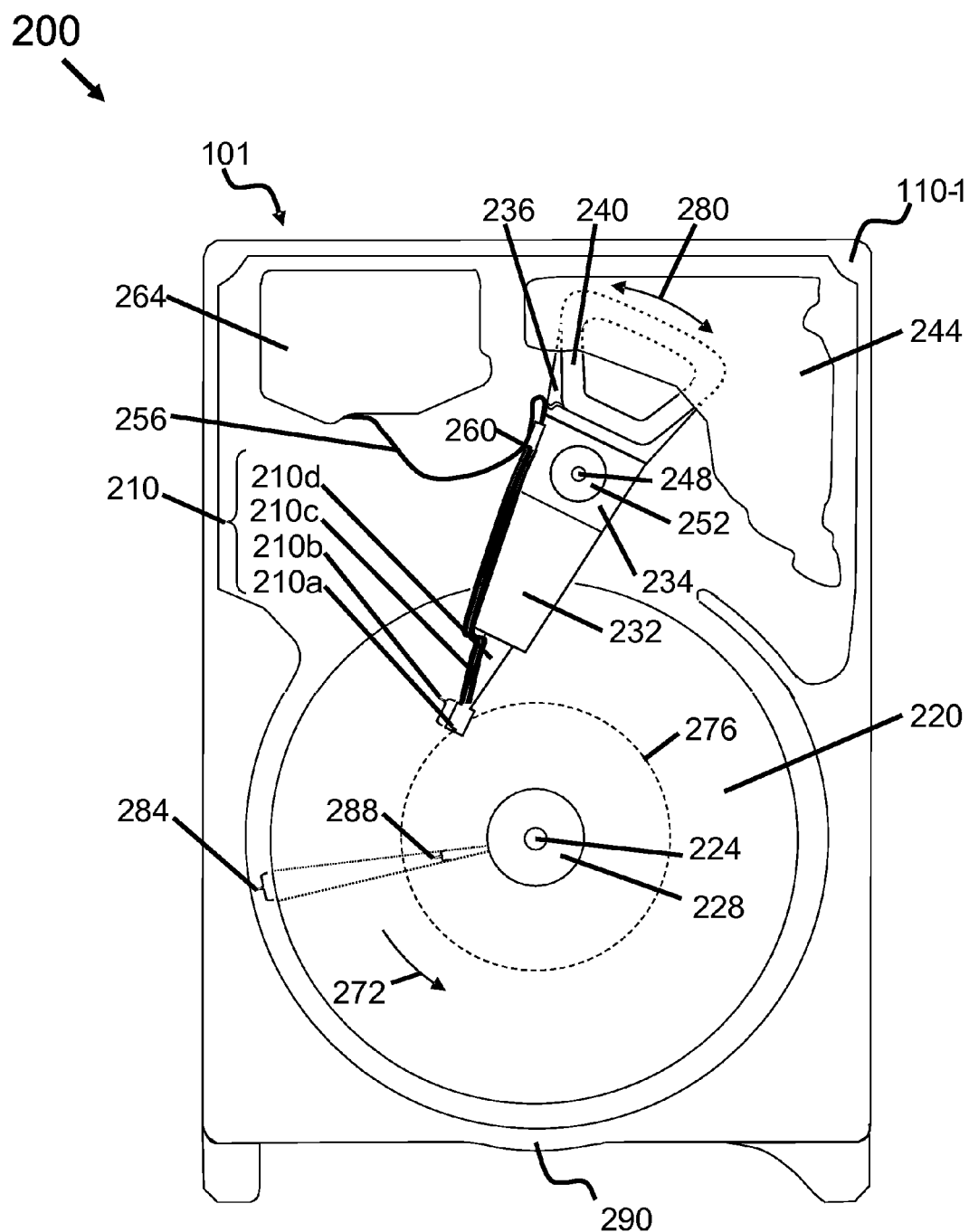
FIG. 2 is a plan view of a low-profile HDD of FIG. 1 with the DE cover removed, in accordance with embodiments of the present invention.

With reference now to FIG. 2 and further reference to FIG. 1, in accordance with embodiments of the present invention, a plan view 200 of the low-profile HDD 101 is shown. FIG. 2 illustrates the functional arrangement of component parts in low-profile HDD 101. The higher areal density of information recorded on magnetic-recording disks now enables the use of a single magnetic-recording disk to record large amounts of data, as previously described. The low-profile HDD 101 includes a single magnetic-recording disk 220 to provide a low profile for the DE 110 that allows the low-profile HDD 101 to be employed in miniaturized electronic devices, for example, lap-top computers. The magnetic-recording disk 220 is rotatably mounted on a spindle 224 and a drive motor (not shown) attached to the spindle 224 for rotating the magnetic-recording disk 220. The low-profile HDD 101 includes at least one HGA 210 including a magnetic-recording head 210a, a lead suspension 210c attached to the magnetic-recording head 210a, and a load beam 210d attached to a slider 210b, which includes the magnetic-recording head 210a at a distal end of the slider 210b; the slider 210b is attached at the distal end of the load beam 210d to a gimbal portion of the load beam 210d. The magnetic-recording head 210a includes a write element, a so-called writer, and a read element, a so-called reader, for respectively writing and reading information stored on the magnetic-recording disk 220 of the low-profile HDD 101. The magnetic-recording disk 220 may be affixed to the spindle 224 with a disk clamp 228. The low-profile HDD 101 further includes an arm 232 attached to the HGA 210, a VCM that includes an armature 236 including a voice-coil 240 attached to the arm 232; and a stator 244 including a voice-coil magnet (not shown); the armature 236 of the VCM is attached to the arm 232 and is configured to move the arm 232 and the HGA 210 to access portions of the magnetic-recording disk 220 being mounted on a pivot 248 with an interposed pivot bearing 252.

With further reference to FIG. 2, in accordance with an embodiment of the present invention, electrical signals, for example, current to the voice-coil 240 of the VCM, write signal to and read signal from the magnetic-recording head 210a, are provided by a flexible cable 256. Interconnection between the flexible cable 256 and the magnetic-recording head 210a may be provided by an arm-electronics (AE) module 260, which may have an on-board pre-amplifier for the read signal, as well as other read-channel and write-channel electronic components. The flexible cable 256 is coupled to an electrical-connector block 264, which provides electrical communication through electrical feedthroughs (not shown) provided by a DE base 110-1. The DE base 110-1, also referred to as a casting, in conjunction with a DE cover 110-2 (see FIG. 1) provides the DE 110, which is sealed and protects the information storage components of the low-profile HDD 101. In accordance with embodiments of the present invention, the DE base 110-1 also includes a projecting portion 290 that allows the magnetic-recording disk 220 to be disposed close to the back side of the low-profile HDD 101, which lessens the HDD length 109 and further reduces the foot print of the low-profile HDD 101 occupied by the low-profile HDD 101 installed in host equipment. Moreover, in accordance with embodiments of the present invention, the projecting portion 290 of the DE base 110-1 provides extra area for compression of the sealing member between the DE base 110-1 and the DE-cover 110-2.

With further reference to FIG. 2, in accordance with an embodiment of the present invention, other electronic components (not shown), including as a disk controller and servo-control electronics including a digital-signal processor (DSP), provide electrical signals to the drive motor, the voice-coil 240 of the VCM and the magnetic-recording head 210a of the HGA 210. The electrical signal provided to the drive motor enables the drive motor to spin providing a torque to the spindle 224 which is in turn transmitted to the magnetic-recording disk 220 that is affixed to the spindle 224 by the disk clamp 228; as a result, the magnetic-recording disk 220 spins in a direction 272. The spinning magnetic-recording disk 220 creates a cushion of air that acts as an air bearing on which the air-bearing surface (ABS) of the slider 210b rides so that the slider 210b flies above the surface of the magnetic-recording disk 220 without making contact with a thin magnetic-recording medium of the magnetic-recording disk 220 in which information is recorded. The electrical signal provided to the voice-coil 240 of the VCM enables the magnetic-recording head 210a of the HGA 210 to access a data track 276 on which information is recorded. Thus, the armature 236 of the VCM swings through an arc 180, which enables the HGA 210 attached to the armature 236 by the arm 232 to access various data tracks on the magnetic-recording disk 220. Information is stored on the magnetic-recording disk 220 in a plurality of concentric data tracks (not shown) arranged in sectors on the top of the magnetic-recording disk 220, for example, sector 284. Correspondingly, each data track is composed of a plurality of sectored data track portions, for example, sectored data track portion 288. Each sectored data track portion 288 is composed of recorded data and a header containing a servo-burst-signal pattern, for example, an ABCD-servo-burst-signal pattern, information that identifies the data track 276, and error correction code information. In accessing the data track 276, the read element of the magnetic-recording head 210a of the HGA 210 reads the servo-burst-signal pattern which provides information to the servo-control electronics, which controls the electrical signal provided to the voice-coil 240 of the VCM, enabling the magnetic-recording head 210a to follow the data track 276. Upon finding the data track 276 and identifying a particular sectored data track portion 288, the magnetic-recording head 210a either reads data from the data track 276 or writes data to the data track 276 depending on instructions received by the disk controller from an external agent, for example, a microprocessor of a computer system.

With further reference to FIG. 2, in accordance with an embodiment of the present invention, a plan view of a head-arm-assembly (HAA) is shown. FIG. 2 illustrates the functional arrangement of the HAA with respect to VCM and HGA 210. The HAA includes the HGA 210 and the arm 232. The HAA is attached at the arm 232 to a carriage 234. As shown in FIG. 2, the armature 236 of the VCM is attached to the carriage 234 and the voice-coil 240 is attached to the armature 236. The AE module 260 may be attached to the carriage 234 as shown. The carriage 234 is mounted on the pivot 248 with the interposed pivot bearing 252.

Figure 3:
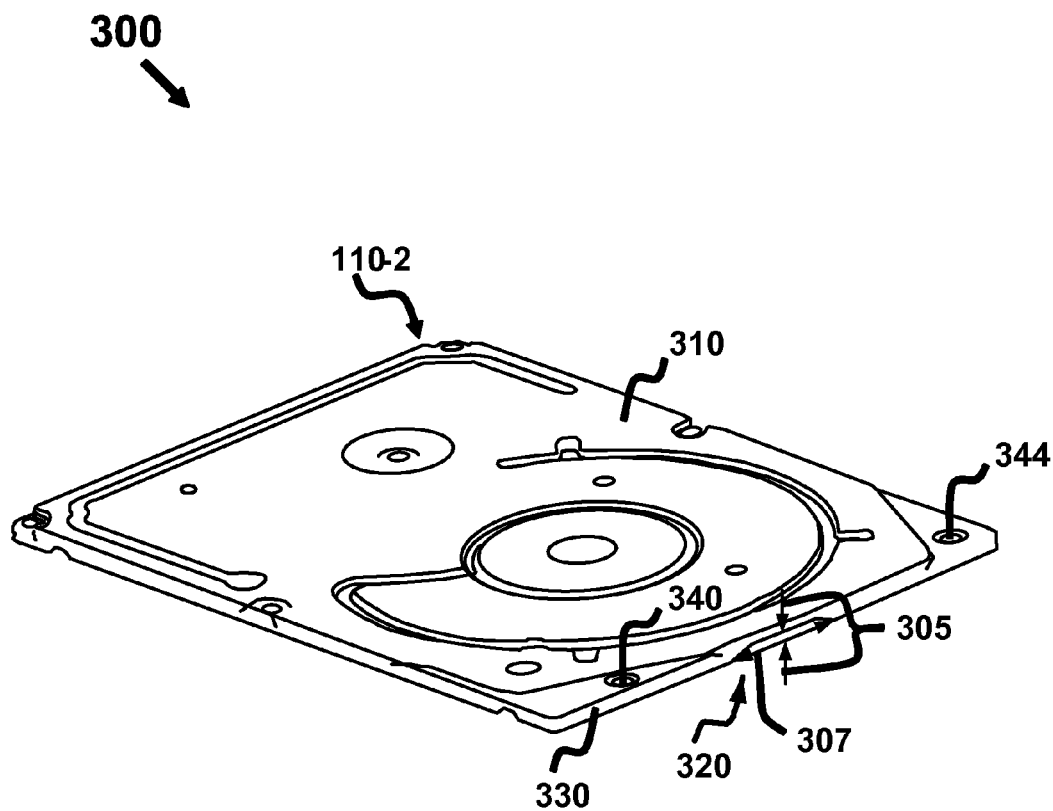
FIG. 3 is a perspective view of a DE cover for the low-profile HDD of FIG. 1, in accordance with embodiments of the present invention.

With reference now to FIG. 3, in accordance with embodiments of the present invention, a perspective view 300 of a DE cover 110-2 for the low-profile HDD 101 of FIG. 2 is shown. In accordance with embodiments of the present invention, the DE cover 110-2 for the low-profile HDD 101 includes a substantially flat (as described above), plate-like portion 310, in which the plate-like portion 310 includes a periphery; and a peripheral flange 330 disposed at the periphery. In accordance with embodiments of the present invention, the peripheral flange 330 includes a recessed portion 320; the recessed portion 320 is configured to be recessed from the SATA connector 130 in proximity to the SATA connector 130. Moreover, in accordance with embodiments of the present invention, the recessed portion 320 is configured to allow a top portion of the SATA connector 130 to be disposed in close proximity to the peripheral flange 330 when the SATA connector 130 is seated on a receiving connector of the low-profile HDD 101. In accordance with embodiments of the present invention, the peripheral flange 330 is configured as a bent portion to be disposed in proximity to a side of the DE base 110-1. In accordance with embodiments of the present invention, the peripheral flange 330 is adapted to seal the DE 110 without interference with the SATA connector 130. In accordance with embodiments of the present invention, the plate-like portion 310 is provided with screw holes, for example, screw holes 340 and 344, that are disposed proximately to the recessed portion 320; the screw holes 340 and 344 are configured to allow compression of the sealing member to seal the DE 110. By way of example, in accordance with embodiments of the present invention, the recessed portion 320 includes a recess shaped like an arch, without limitation thereto, as other shapes that also accommodate the SATA connector 130 are also within the spirit and scope of embodiments of the present invention. In accordance with embodiments of the present invention, the arch has an apex with a height 305 (indicated by the opposing pair of arrows in FIG. 3) greater than about 1 mm above a base of the arch at a deepest location of the recess, and a width 307 of the base of the arch at least 15 mm at a widest portion of the recess. Moreover, in accordance with embodiments of the present invention, a recessed portion 320 that has a shape other than an arch may have a height, similar to height 305, greater than about 1 mm above a base of the recessed portion 320 at a deepest location of the recess, and a width, similar to width 307, of the base of the recessed portion 320 at least 15 mm at a widest portion of the recess.

With further reference to FIG. 3 and further reference to FIGS. 1 and 2, in accordance with embodiments of the present invention, in order to avoid interference, the height of the DE base 110-1 is reduced in proximity to the location of the SATA connector 130. This entails also reducing the height of the peripheral flange 330 of the DE cover 110-2 corresponding to the DE base 110-1. In other words, a recessed portion 320 is provided in the peripheral flange 330 at the location of the SATA connector 130. The extent of interference decreases with increasing separation from the outermost periphery of the magnetic-recording disk 220 on the side of the SATA connector 130, so the extent of the recessed portion 320 correspondingly also decreases. Hence, the recessed portion 320, which may be an arch-shaped recess, in one embodiment of the present invention, without limitation thereto, is centered on the portion corresponding to the outermost periphery of the magnetic-recording disk 220 on the side of the SATA connector 130. The recess has a depth of 1 mm at the deepest location, and decreases in width in arched fashion, without limitation thereto, in a stepwise manner from a width of 15 mm to 3 mm.

Figure 4A:
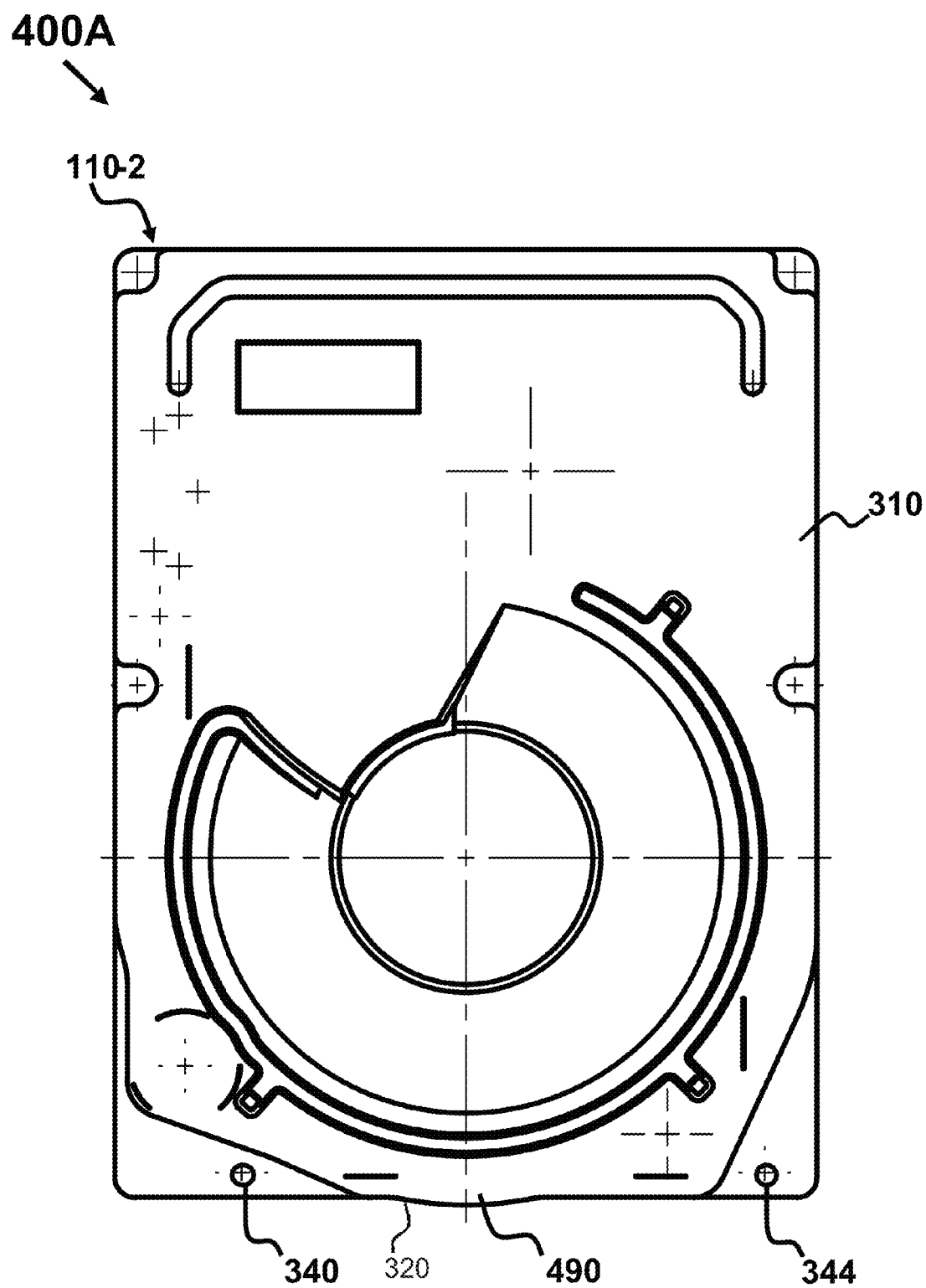
FIG. 4A is a top-down plan view of the DE cover of FIG. 3, in accordance with embodiments of the present invention.
Figure 4B:
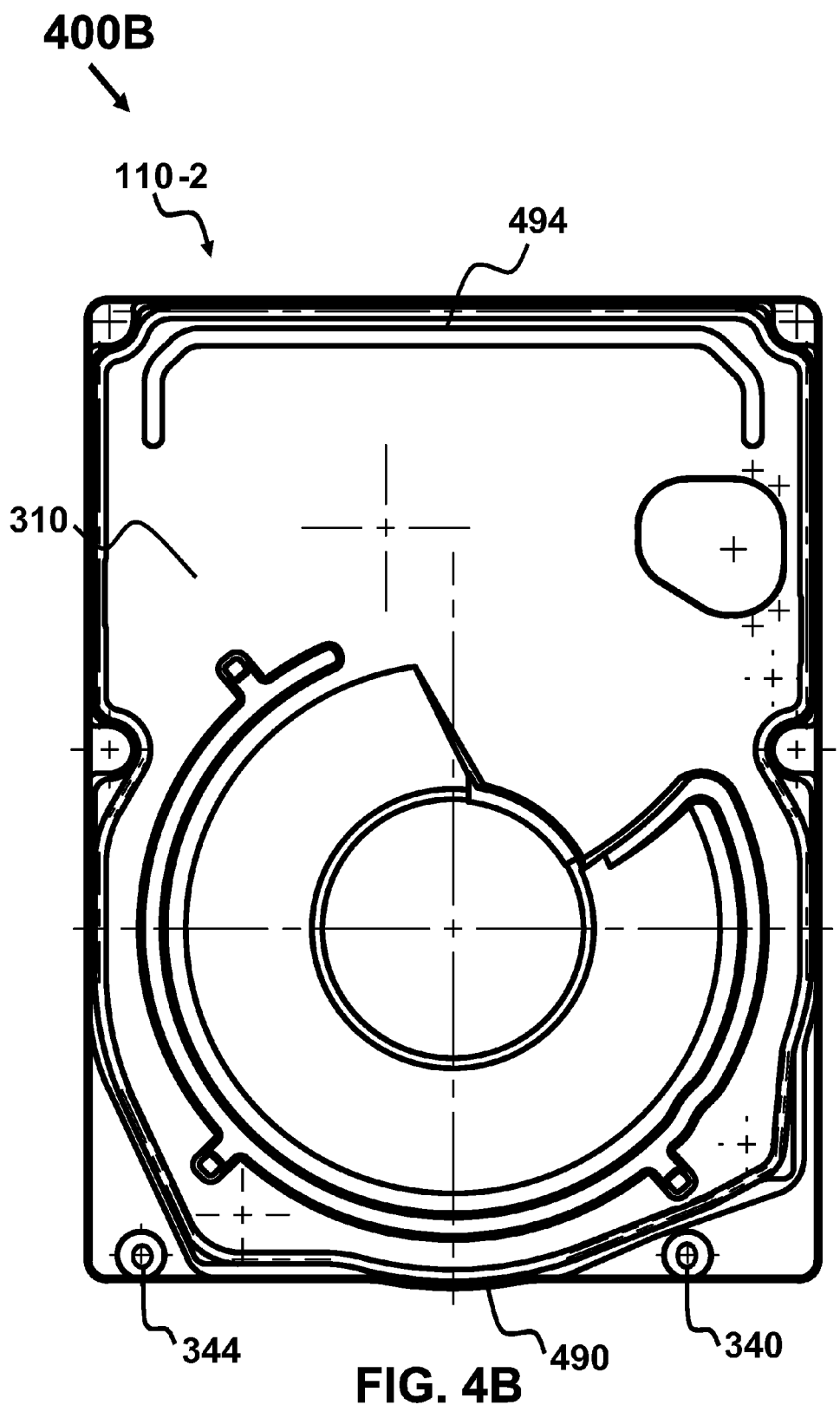
FIG. 4B is a bottom-up plan view of the DE cover of FIG. 3, in accordance with embodiments of the present invention.

With reference now to FIGS. 4A and 4B and further reference to FIGS. 1-3, in accordance with embodiments of the present invention, a top-down plan view 400A is shown of the DE cover 110-2 in FIG. 4A; and, a bottom-up plan view 400B is shown of the DE cover 110-2 in FIG. 4B. A plurality of registration marks is also shown in FIGS. 4A and 4B as crosses, for purpose of illustration, that are indicative of the alignment in the assembled DE 110 of the DE cover 110-2 with the DE base 110-1, which is shown with corresponding registration marks in FIG. 5. In accordance with embodiments of the present invention, the DE cover 110-2 further includes a projecting portion 490; and, the projecting portion 490 is located adjacent to the peripheral flange 330 and the recessed portion 320. In accordance with embodiments of the present invention, the projecting portion 490 is configured to provide a surface to compress a portion of a sealing member that is disposed in proximity to the recessed portion 320; and, the projecting portion 490 of the DE cover 110-2 aligns with the projecting portion 290 of the DE base 110-1 upon assembly of the DE 110 in a clam-shell fashion compressing the sealing member between the DE base 110-1 and the DE cover 110-2. In accordance with embodiments of the present invention, the plate-like portion 310 and the screw holes 340 and 344 that are disposed proximately to the recessed portion 320 are also shown in FIGS. 4A and 4B; as previously described, the screw holes 340 and 344 are configured to allow compression of the sealing member to seal the DE 110. In accordance with embodiments of the present invention, the DE cover 110-2 may include a groove 494 located in proximity to the periphery of the DE cover 110-2 on the DE-base-facing side of the DE cover 110-2 that is configured to accept the sealing member, as shown in FIG. 4B.

Figure 5:
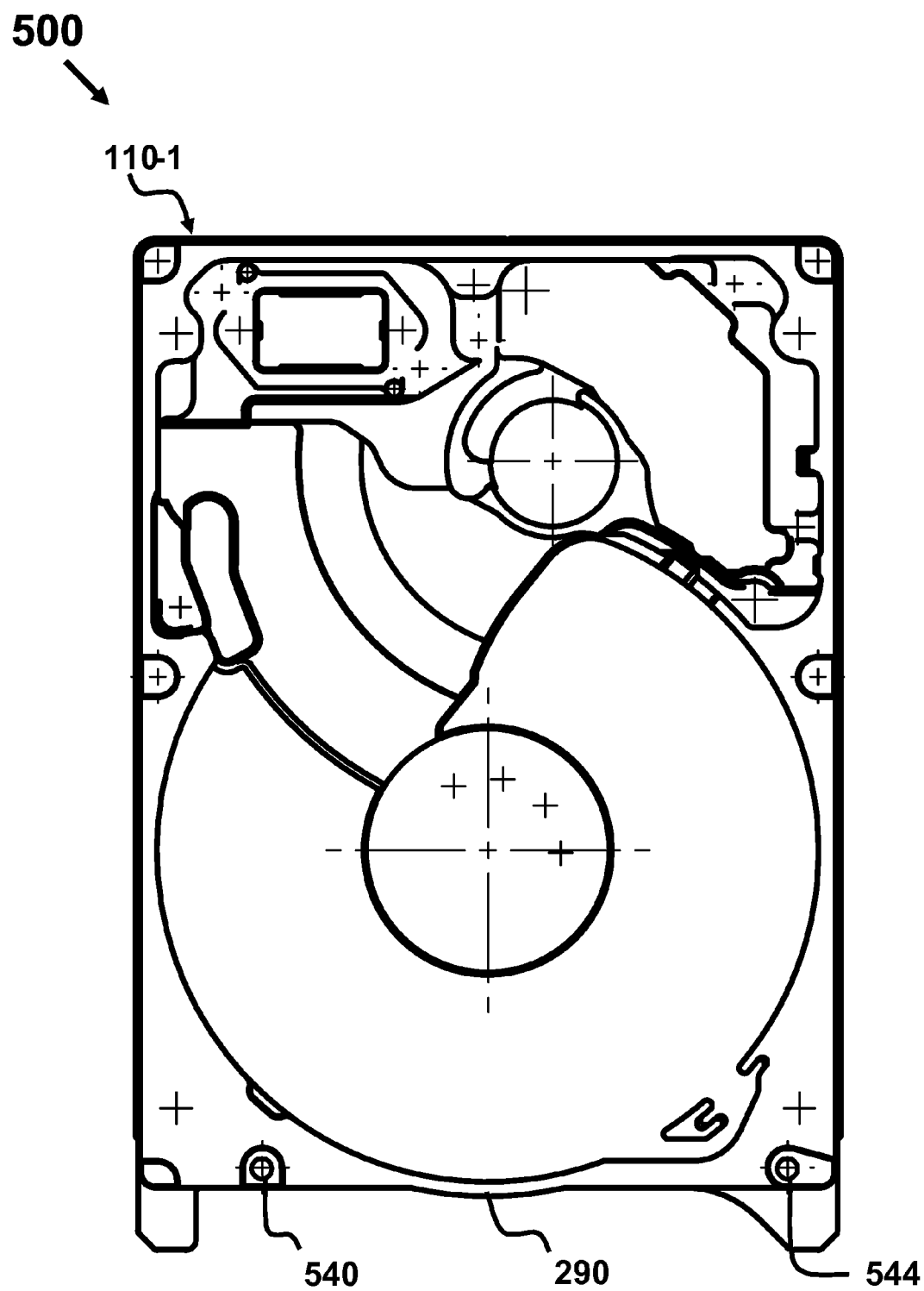
FIG. 5 is a top-down plan view of a DE base for the low-profile HDD of FIG. 1, in accordance with embodiments of the present invention.

With reference now to FIG. 5, in accordance with embodiments of the present invention, a top-down plan view 500 is shown of the DE base 110-1 for the low-profile HDD 101. A plurality of registration marks is also shown in FIG. 5 as crosses, for purpose of illustration, that are indicative of the alignment in the assembled DE 110 of the DE base 110-1 with the DE cover 110-2, which is shown with corresponding registration marks in FIGS. 4A and 4B, as described above. In accordance with embodiments of the present invention, the DE base 110-1 is provided with screw holes, for example, screw holes 540 and 544, that are disposed proximately to the projecting portion 290; the screw holes 540 and 544 are configured to allow compression of the sealing member to seal the DE 110.

Figure 6:
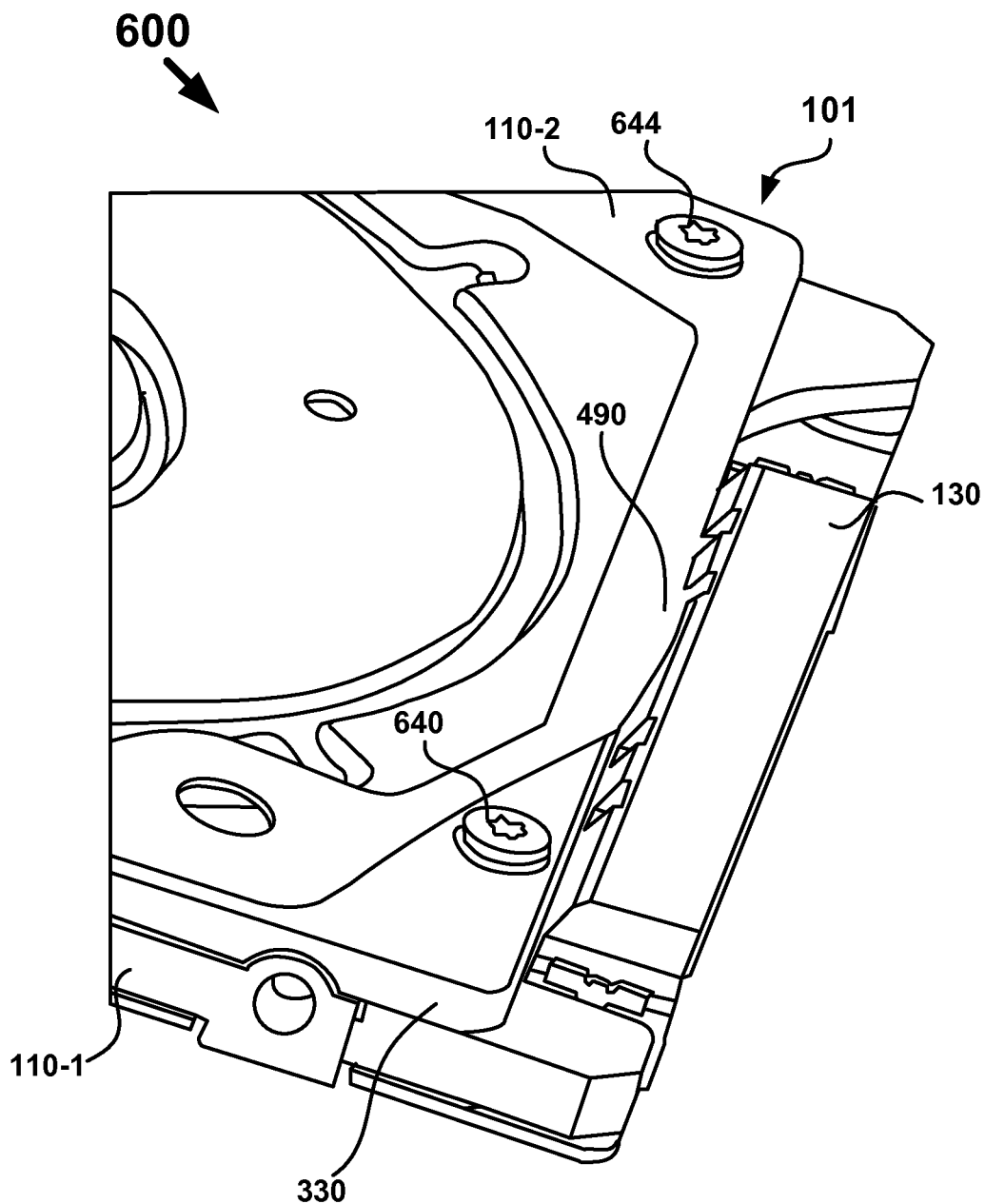
FIG. 6 is a cut-away, perspective view of the back end of an assembled disk enclosure for the low-profile HDD of FIG. 1 illustrating the placement of the SATA connector with respect to the DE cover of FIG. 3, in accordance with embodiments of the present invention.

With reference now to FIG. 6, in accordance with embodiments of the present invention, a cut-away, perspective view 600 is shown of the back end of the assembled DE 110 for the low-profile HDD 101. FIG. 6 illustrates the placement of the SATA connector 130 with respect to the DE cover 110-2. In accordance with embodiments of the present invention, the projecting portion 490 of the DE cover 110-2 allows for expansion of the sealing member as the screws 640 and 644 are torqued down in the respective screw holes 340 and 344 of the DE cover 110-2 and the respective screw holes 540 and 544 of the DE base 110-1 to seal the DE cover 110-2 to the DE base 110-1 in the assembled DE 110.

With further reference to FIG. 6, in accordance with embodiments of the present invention, the sealing member for maintaining air tightness of the low-profile HDD 101 is sandwiched between the upper face of the DE base 110-1 and the DE cover 110-2. The sealing member is formed of rubber and is compressed in a prescribed ratio by screwing the DE cover 110-2 onto the DE base 110-1. The sealing member is appropriately compressed over the entire periphery of the DE base 110-1 upper face, in order for the air tightness to be maintained by compression in a prescribed ratio. In accordance with embodiments of the present invention, peripheral flange 330 is provided at the outer periphery of the DE cover 110-2; by this means, the rigidity of the DE cover 110-2 itself is provided, so that even though the DE cover 110-2 is only screwed onto the DE base 110-1 at prescribed intervals, the sealing member itself is compressed to an appropriate extent when the sealing member is forced onto the DE base 110-1 by the DE cover 110-2 between the positions of the screws 640 and 644. However, since the rigidity of the DE cover 110-2 in the portion where the recessed portion 320 is provided is smaller than it is in other portions of the DE cover 110-2, the sealing member cannot be fully compressed at the side of the SATA connector 130 if the positions of the DE cover 110-2 screws 640 and 644 are the same as in the case of the conventional 2.5 inch HDD of HDD height 9.5 mm, such that air tightness is maintained. Therefore, in accordance with embodiments of the present invention, the screw holes 340 and 344, and the corresponding screw holes 540 and 544, are offset on either side of the recessed portion 320 so that the interval between the screw holes 340 and 344, and between the corresponding screw holes 540 and 544, becomes smaller. In the case of the 2.5 inch low-profile HDD 101 of HDD height 7 mm, the interval between the screws, which was conventionally 65 mm, is reduced to 52 mm. The 2.5 inch low-profile HDD 101 of HDD height 7 mm constructed in this way has the following characteristic features with respect to its external shape. Specifically, in accordance with embodiments of the present invention, the edge face of the DE base 110-1 on the side of the SATA connector 130 projects in the projecting portion 290 corresponding to the outermost peripheral shape of the magnetic-recording disk 220, in plan view. Likewise, in accordance with embodiments of the present invention, the edge face of the external shape of the DE cover 110-2 on the side of the SATA connector 130 corresponding to the DE base 110-1 projects in the projecting portion 490 corresponding to the outermost peripheral shape of the magnetic-recording disk 220. Moreover, in accordance with embodiments of the present invention, an arch-shaped, without limitation thereto, recessed portion 320 is provided with respect to the projecting portion 490, in the peripheral flange 330 of the DE cover 110-2 on the side of the SATA connector 130.

Figure 7:
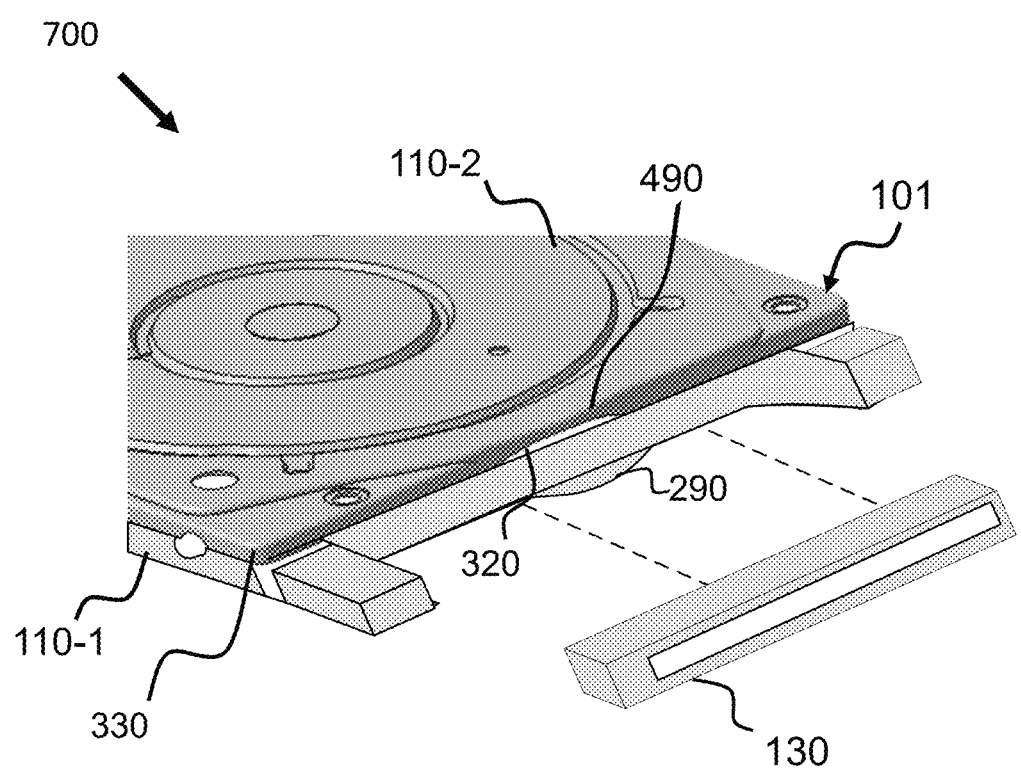
FIG. 7 is an exploded view of the back end of an assembled disk enclosure for the low-profile HDD of FIG. 1 illustrating the placement of the SATA connector with respect to the DE cover of FIG. 3, in accordance with embodiments of the present invention.

With reference now to FIG. 7 an exploded view of the back end of an assembled disk enclosure for the low-profile HDD of FIG. 1 illustrating the placement of the SATA connector with respect to the DE cover of FIG. 3, is shown in accordance with embodiments of the present invention.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk-enclosure cover for a low-profile, hard-disk drive, comprising:
   a substantially flat, plate-like portion, said plate-like portion having a periphery; and
   a peripheral flange disposed at said periphery;
   wherein said peripheral flange includes a recessed portion, said recessed portion configured to be recessed from a SATA connector in proximity to said SATA connector; and
   wherein said recessed portion is configured to allow a top portion of said SATA connector to be disposed in close proximity to said peripheral flange when said SATA connector is seated on a receiving connector of said low-profile, hard-disk drive.

2. The disk-enclosure cover of claim 1, wherein said peripheral flange is configured as a bent portion to be disposed in proximity to a side of a disk-enclosure base.

3. The disk-enclosure cover of claim 1, wherein said peripheral flange is adapted to seal said disk enclosure without interference with said SATA connector.

4. The disk-enclosure cover of claim 1, further comprising:
   a projecting portion, said projecting portion adjacent to said peripheral flange and said recessed portion.

5. The disk-enclosure cover of claim 4, wherein said projecting portion is configured to provide a surface to compress a portion of a sealing member that is disposed in proximity to said recessed portion.

6. The disk-enclosure cover of claim 1, wherein said plate-like portion is provided with screw holes disposed proximately to said recessed portion, said screw holes configured to allow compression of a sealing member to seal said disk enclosure.

7. The disk-enclosure cover of claim 1, wherein said recessed portion comprises a recess that is shaped like an arch.

8. The disk-enclosure cover of claim 7, wherein said arch has an apex greater than about 1 mm above a base of said arch at a deepest location of said recess, and a width of said base of at least 15 mm at a widest portion of said recess.

9. A disk enclosure for a low-profile, hard-disk drive, comprising:
   a disk-enclosure base; and
   a disk-enclosure cover, comprising:
   a substantially flat, plate-like portion, said plate-like portion having a periphery; and
   a peripheral flange disposed at said periphery;
   wherein said peripheral flange includes a recessed portion, said recessed portion configured to be recessed from a SATA connector in proximity to said SATA connector;
   wherein said recessed portion is configured to allow a top portion of said SATA connector to be disposed in close proximity to said peripheral flange when said SATA connector is seated on a receiving connector of said hard-disk drive; and
   wherein said disk-enclosure base is configured to form an air-tight seal with said disk-enclosure cover.

10. The disk enclosure of claim 9, further comprising:
    a projecting portion of said disk-enclosure base; and
    a projecting portion of said disk-enclosure cover;
    wherein said projecting portion of said disk-enclosure cover is adjacent to said peripheral flange and said recessed portion.

11. The disk enclosure of claim 10, wherein said projecting portions of said disk-enclosure base and of said disk-enclosure cover are configured to provide surfaces to compress a portion of a sealing member that is disposed in proximity to said recessed portion to form an air-tight seal.

12. The disk enclosure of claim 9, wherein said plate-like portion of said disk-enclosure cover is provided with screw holes disposed proximately to said recessed portion; and
    said disk-enclosure base is provided with screw holes configured to align with said screw holes of said disk-enclosure cover;
    wherein said screw holes of said disk-enclosure cover and said screw holes of said disk-enclosure base are configured to allow compression of a sealing member to seal said disk enclosure.

13. A low-profile, hard-disk drive, comprising:
    a disk enclosure for a low-profile, hard-disk drive, comprising:
    a disk-enclosure base; and
    a disk-enclosure cover, comprising:
    a substantially flat, plate-like portion, said plate-like portion having a periphery; and
    a peripheral flange disposed at said periphery;
    wherein said peripheral flange includes a recessed portion, said recessed portion configured to be recessed from a SATA connector in proximity to said SATA connector;
    wherein said recessed portion is configured to allow a top portion of said SATA connector to be disposed in close proximity to said peripheral flange when said SATA connector is seated on a receiving connector of said hard-disk drive; and
    wherein said disk-enclosure base is configured to form an air-tight seal with said disk-enclosure cover;
    a head-arm assembly comprising:

a head-gimbal assembly comprising a magnetic-recording head; and
an arm attached to said head-gimbal assembly;
a magnetic-recording disk rotatably mounted on a spindle;
a drive motor mounted in said disk enclosure, said drive motor having a motor shaft attached to said spindle for rotating said magnetic-recording disk;
a voice-coil motor comprising:
    an armature including a voice-coil attached to said arm; and
    a stator including a voice-coil magnet mounted in said enclosure;
    wherein said armature of said voice-coil motor is attached to said arm and is configured to move said head-arm assembly to access portions of said magnetic-recording disk.

14. The low-profile, hard-disk drive of claim 13, wherein said peripheral flange further comprises a bent portion disposed in proximity to a side of said disk-enclosure base.

15. The low-profile, hard-disk drive of claim 13, wherein said peripheral flange is adapted to seal said disk enclosure without interference with said SATA connector.

16. The low-profile, hard-disk drive of claim 13, further comprising:
a projecting portion of said disk-enclosure base; and
a projecting portion of said disk-enclosure cover;
wherein said projecting portion of said disk-enclosure cover is adjacent to said peripheral flange and said recessed portion.

17. The low-profile, hard-disk drive of claim 16, wherein said projecting portions of said disk-enclosure base and of said disk-enclosure cover are configured to provide surfaces to compress a portion of a sealing member that is disposed in proximity to said recessed portion to form an air-tight seal.

18. The low-profile, hard-disk drive of claim 13, wherein said plate-like portion of said disk-enclosure cover is provided with screw holes disposed proximately to said recessed portion; and
said disk-enclosure base is provided with screw holes configured to align with said screw holes of said disk-enclosure cover;
wherein said screw holes of said disk-enclosure cover and said screw holes of said disk-enclosure base are configured to allow compression of a sealing member to seal said disk enclosure.

19. The low-profile, hard-disk drive of claim 13, wherein said low-profile, hard-disk drive has a height less than about 7 mm.

20. The low-profile, hard-disk drive of claim 19, wherein said recessed portion comprises a recess that is shaped like an arch; and
wherein said arch has an apex greater than about 1 mm above a base of said arch at a deepest location of said recess, and a width of said base of at least 15 mm at a widest portion of said recess.

\* \* \* \* \*